United States Patent
Edmiston

(10) Patent No.: US 9,450,894 B2
(45) Date of Patent: Sep. 20, 2016

(54) INTEGRATED CIRCUIT DEVICE AND METHOD OF PERFORMING CUT-THROUGH FORWARDING OF PACKET DATA

(75) Inventor: Graham Edmiston, Bridge of Weir (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 91 days.

(21) Appl. No.: 14/125,203

(22) PCT Filed: Jun. 15, 2011

(86) PCT No.: PCT/IB2011/052601
§ 371 (c)(1),
(2), (4) Date: Dec. 10, 2013

(87) PCT Pub. No.: WO2012/172389
PCT Pub. Date: Dec. 20, 2012

(65) Prior Publication Data
US 2014/0098824 A1    Apr. 10, 2014

(51) Int. Cl.
| H04L 12/28 | (2006.01) |
| H04L 12/861 | (2013.01) |
| H04L 12/54 | (2013.01) |
| H04L 12/721 | (2013.01) |
| H04L 12/773 | (2013.01) |

(52) U.S. Cl.
CPC .......... *H04L 49/9057* (2013.01); *H04L 12/56* (2013.01); *H04L 45/40* (2013.01); *H04L 45/60* (2013.01)

(58) Field of Classification Search
None
See application file for complete search history.

(56) References Cited

U.S. PATENT DOCUMENTS

| 5,119,481 A * | 6/1992 | Frank et al. ................... 710/100 |
| 6,731,638 B1 | 5/2004 | Ofek |
| 7,000,031 B2 | 2/2006 | Fischer et al. |
| 7,406,106 B2 | 7/2008 | Mallory |
| 7,477,641 B2 | 1/2009 | Jain et al. |
| 7,613,775 B2 | 11/2009 | Greaves et al. |
| 7,729,387 B2 | 6/2010 | Beck et al. |
| 2003/0026206 A1 | 2/2003 | Mullendore et al. |
| 2003/0095553 A1 | 5/2003 | Shiomoto et al. |
| 2004/0066782 A1 | 4/2004 | Nassar |

(Continued)

FOREIGN PATENT DOCUMENTS

| CN | 101095319 A | 12/2007 |
| EP | 0781010 A2 | 6/1997 |

OTHER PUBLICATIONS

Iyer, S. et al., "Designing Packet Buffers for Router Linecards", IEEE/ACM Transactions on Networking, vol. 16, Issue 3, Jun. 2008, pp. 705-717.
International Search Report and Written Opinion correlating to PCT/IB2011/052601 dated Feb. 24, 2012.

*Primary Examiner* — Phirin Sam

(57) ABSTRACT

An integrated circuit device includes a cut-through forwarding module. The cut-through forwarding module includes at least one receiver component arranged to receive data to be forwarded, and at least one transmitter component arranged to transmit data stored within at least one transmitter buffer thereof. The cut-through forwarding module further includes at least one delimiter component arranged to trigger a transmission of frame data within the at least one transmitter buffer, upon receipt of a first number elements of a respective data frame by the at least one receiver component, the first number of data elements comprising a first predefined integer value.

20 Claims, 5 Drawing Sheets

(56) References Cited

U.S. PATENT DOCUMENTS

| | | |
|---|---|---|
| 2004/0120340 A1 | 6/2004 | Furey et al. |
| 2005/0058149 A1 | 3/2005 | Howe |
| 2005/0271073 A1* | 12/2005 | Johnsen et al. ............... 370/428 |
| 2006/0114907 A1 | 6/2006 | Wu |
| 2006/0159102 A1 | 7/2006 | Major |
| 2008/0019395 A1 | 1/2008 | Aithal |
| 2009/0103441 A1* | 4/2009 | Nakamura ................... 370/241 |
| 2011/0026538 A1* | 2/2011 | Takeuchi .............. H04L 49/251 370/401 |
| 2012/0230348 A1* | 9/2012 | Pannell ............... H04L 47/6215 370/437 |
| 2014/0321281 A1* | 10/2014 | Poole et al. ................... 370/235 |

* cited by examiner

INTEGRATED CIRCUIT DEVICE AND METHOD OF PERFORMING CUT-THROUGH FORWARDING OF PACKET DATA

FIELD OF THE INVENTION

The field of this invention relates to an integrated circuit device and a method of performing cut-through forwarding of packet data therefor.

BACKGROUND OF THE INVENTION

In the field of computer networking, cut-through forwarding, also known as cut-through switching, is a switching method for packet switching systems in which a network switch starts forwarding a frame (or packet) before the whole frame has been received by the network switch. Such a forwarding operation is performed typically as soon as the destination address has been processed. In this manner, cut-through forwarding enables the latency through the switch to be significantly reduced. The use of cut-through forwarding is an important feature of packet-orientated deterministic automation systems. Furthermore, the implementation of such systems is expanding in the industrial market, and the technique is increasingly finding its way into solutions for home, medical and automotive applications.

Cut-through forwarding systems typically require tight control over the latency of a switch (e.g. the delay between data being received by the switch and that data subsequently being transmitted (forwarded on) by the switch) and jitter (e.g. the variance in time periods between the transmission of consecutive frames) in order to ensure deterministic behaviour and scalability. Typically, such latency/jitter requirements differ between different cut-through 'modes' (e.g. between different packet switching protocols). For example, such cut-through modes might include, by way of example, Ethernet protocols such as EtherCAT (Ethernet for Control Automation Technology), ProfiNET, Ethernet/IP, Sub-station automation (IEC 62439), DLR (Device Level Ring) or a cut through switch for IP traffic. Control over latency and jitter is of particular importance for cut-through forwarding modes that involve Ethernet frames and the like, in which frames are unpredictably spaced and may be seconds apart or back-to-back, unlike, say, Voice over Internet Protocol (IP) (VoIP) which has predictable frame spacing. In order for a cut-through switch to be competitive in the market place, it must be capable of supporting such deterministic behaviour and scalability across multiple cut-through switching modes.

Conventionally tight control of latency and jitter is provided by way of dedicated hardware blocks that are arranged to meet specific latency and jitter requirements. The use of such dedicated hardware blocks on a single device leads to a relatively expensive and somewhat inflexible solution. In particular, in order for a given switch to be able to meet the requirements of more than one cut-through mode, a separate, dedicated hardware block is required for each cut-through forwarding mode, thereby resulting in a significant increase in cost, power consumption and real estate requirements for the switch.

SUMMARY OF THE INVENTION

The present invention provides an integrated circuit device and a method of performing cut-through forwarding of packet data as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to an example of a cut-through forwarding module, such as may be implemented within a packet switching system. However, the present invention is not limited to the specific cut-through forwarding module architecture described herein with reference to the accompanying drawings, and may equally be applied to alternative architectures. For example, for the illustrated examples, the cut-through forwarding module is illustrated as comprising a RISC (reduced instruction set computer) complex comprising a plurality of RISC processing modules arranged to provide data processing functionality for the cut-through forwarding module. However, the data processing functionality of the cut-through forwarding module may equally be implemented in any suitable alternative manner. For example, the data processing functionality may be provided by a single RISC processor, or by one or more CISC (complex instruction set computer) processing modules, one or more digital signal processors (DSPs), etc. In addition, examples of the present invention will now be described with reference to an example of a number of delimiter implementations. However, the present invention is not limited to the specific delimiter architectures described herein with reference to the accompanying drawings, and may equally be applied to alternative architectures. Additionally, because the illustrated example embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
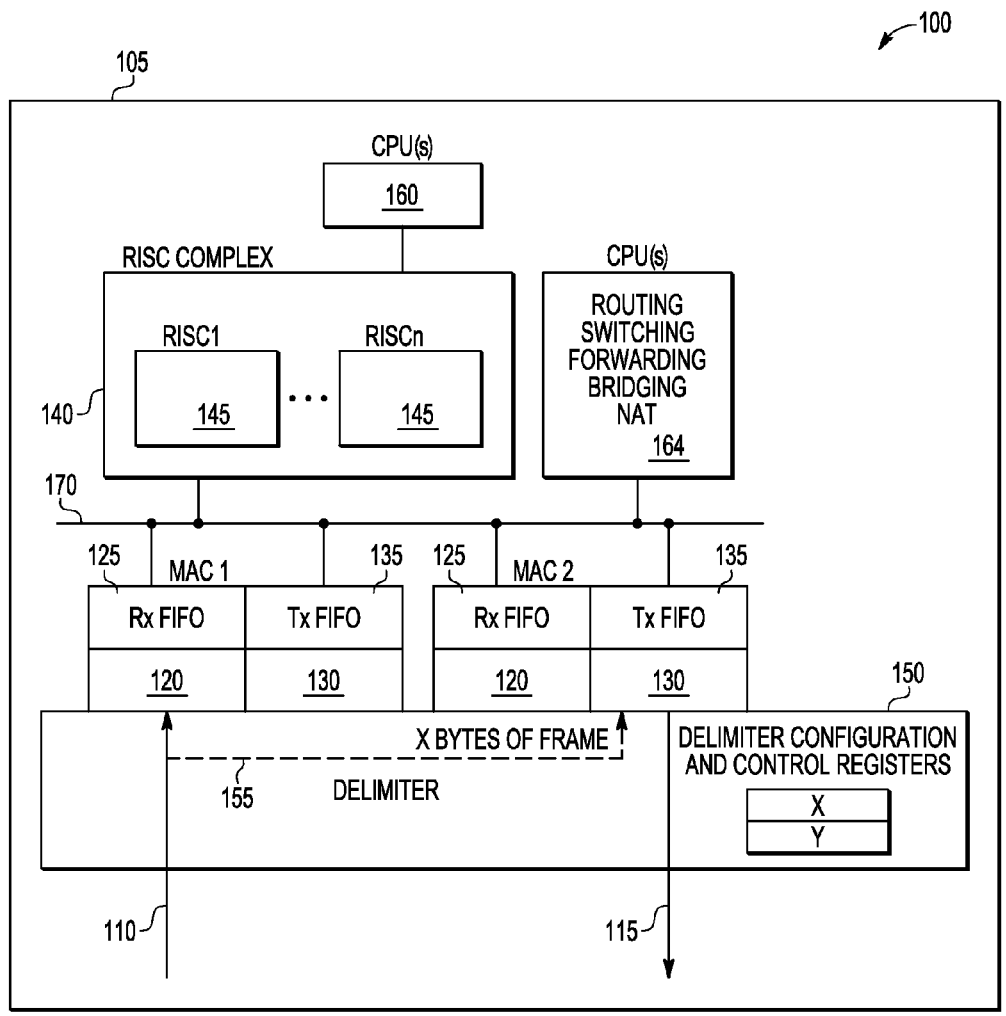
FIG. 1 shows a simplified block diagram of an example of a cut-through forwarding module.

Referring now to FIG. 1, there is illustrated a simplified block diagram of an example of a cut-through forwarding module 100, such as may be implemented within a packet switching system (not shown). In the illustrated example, the cut-through forwarding module 100 is implemented within an integrated circuit device 105. The cut-through forwarding module 100 is arranged to receive packets of data, or 'frames', via one or more input channels as illustrated generally at 110, and to route/forward received data frames over one or more output channels as illustrated generally at 115.

The use of cut-through forwarding switches, such as the cut-through forwarding module 100 in FIG. 1, within a packet switching system enables latency within the packet switching system (e.g. the time between data being transmitted by a source device and that data being received by a destination device) to be reduced. Cut-through forwarding, also known as cut-through switching, is a switching method for packet switching systems in which a network switch (such as cut-through forwarding module 100 in FIG. 1) starts forwarding a data frame (or packet) before the whole frame has been received; typically, but not uniquely, soon after the destination address has been processed. In this manner, cut-through forwarding generally enables the latency through each switch to be significantly reduced. The latency of a cut-through forwarding switch, for example the cut-through forwarding module 100 in FIG. 1, is typically defined as a time between the cut-through forwarding module 100 receiving data and the cut-through forwarding module 100 subsequently transmitting (i.e. forwarding on) that data. Thus, by not waiting until an entire frame has been received before beginning to transmit the data frame, the propagation latency of the switch may be reduced. As transmission of a data frame is commenced before the entire data frame has been received, the data frame may be spread across a plurality of switches within a packet switching system during transmission. By way of example, consider a frame that is 1000 bytes long, and a switching system comprising cut-through forwarding switches, such as cut-through forwarding module 100 in FIG. 1, that commence (re)transmission/forwarding of a data frame after receiving, say, 16 bytes of that frame. That frame may (theoretically) be in transit across over 60 cut-through forwarding switches during an end-to-end packet routing operation. Thus, cut-through forwarding enables the latency across the system to be considerably reduced in comparison to systems in which the entire frame is received by each switching device prior to the entire frame being forwarded.

The cut-through forwarding module 100 in the illustrated example comprises one or more receiver components 120 and one or more transmitter components 130. Each receiver component 120 comprises a receive (Rx) FIFO (first in, first out) buffer 125 in which received data is stored. When a block of 'B' bytes of data has been received by a receiver component 120, the receiver component 120 is arranged to generate a request, or provide some other indication, for that block of data to be processed. Blocks of data for which such requests, or other indications, have been generated, are then processed by, in the illustrated example, one or more RISC processors 145 within a RISC complex 140 of the cut-through forwarding module 100. Each transmitter component 130 comprises a transmit (Tx) FIFO buffer 135 to which blocks of data may be transferred once they have been processed. A block of data within a Tx FIFO buffer 135 may then be transmitted (i.e. forwarded/routed) over the corresponding output channel 115, for example upon a flag being set for that block of data indicating the block of data is ready for transmission, or transmission otherwise being triggered therefor.

The cut-through forwarding module 100 further comprises a delimiter component, illustrated generally at 150.

The delimiter 150 is arranged to trigger the transmission of frame data within a Tx FIFO buffer 135, upon receipt of the first Y bytes of a respective data frame by the respective receiver component 120, Y comprising a predefined integer value.

In this manner, by triggering the transmission of the frame data after receiving Y bytes of the frame data, a substantially absolute and deterministic latency for the start of a data frame through the cut-through forwarding module 100 may be achieved. Such latency is substantially only being dependent on the number Y of bytes after which the transmission is triggered, and the data rate of the respective incoming channel 110. As a result, substantially the same consistent and deterministic latency may be achieved for the start of all data frames within a data stream being forwarded through the cut-through forwarding module 100. In this manner, substantially zero jitter may be introduced into the data stream by the cut-through forwarding module 100. Latency and jitter will be consistent, regardless of any variations in frame size, frame rate or time between consecutive frames therefor. In some examples, since the triggering of the transmission of the start of a data frame is not dependent on, say, operations within the processing domain (e.g. on operations being performed within the RISC complex 140 in the case of the illustrated example), variations in the latency for the start of a frame may be substantially minimised. For clarity, a byte typically comprises 8 bits of data. However, it is contemplated that, for the purposes of the present invention, the term 'byte' used herein may apply equally to any defined number of bits, for example 4, 16, etc.

For some examples, the delimiter 150 may be implemented using, say, an intra-connected bus, for example as represented at 155, at a higher rate than the data rate of the input/output channels 110, 115, and coupled between the respective Rx/Tx FIFO buffers 125, 135, either on the same module or between the Rx FIFO buffer 125 on one module and the Tx FIFO buffer 135 on any other module. Alternatively, for some further examples, the delimiter 150 may comprise a shift register (such as may also be represented at 155) between the respective Rx/Tx FIFO buffers 125, 135, with the shift register sharing the same clock as the input/output channels 110, 115. Alternatively, for some still further examples, the delimiter 150 may comprise an enable bit implemented by simple logic gates and a counter that is activated after a certain number of clock edges from the beginning of the frame reception. This last example assumes that the processing domain 140 is arranged to, and is fast enough to, move the first block or 'X' bytes to the Tx FIFO 125 upon the enable bit being set after expiration of the counter; a part of the functionality of the delimiter 150, such as represented at 155 in this example, being implemented within the processing domain 140.

Alternatively, in other examples, the delimiter may be implemented by means of any other suitable scheme that fulfils the moving of 'X' bytes of data from the Rx FIFO buffer 125 to the Tx FIFO buffer 135 in a deterministic manner.

The delimiter component 150 may be further arranged to transfer X bytes of data received at the start of a data frame (i.e. the first X bytes received of the data frame) from the respective Rx FIFO buffer 125 to the respective Tx FIFO buffer 135, prior to triggering a transmission of frame data within the at least one transmitter buffer (135), X comprising a predefined integer value. For example, the delimiter component 150 may be arranged to transfer X bytes received at the start of a data frame to the respective Tx FIFO buffer 135 upon receipt of said first X bytes at the start of the data frame, with X comprising a predefined integer value less than or equal to Y. In this manner, by automatically transferring the first X bytes before the triggering of the transmission of the frame data after receiving Y bytes of the frame data, it can be ensured that at least these first X bytes of the data frame are present within the Tx FIFO buffer 135 for transmission.

For completeness, the example illustration of the cut-through forwarding module 100 of FIG. 1 is an abstracted view of an example implementation of a cut-through forwarding module 100 utilising one or more microprocessors or microcontrollers. The various components of the cut-through forwarding module 100 are operably coupled to one another by, for example, a data bus 170. The data bus 170 may be implemented by way of an internal bus within the device or could be external. The RISC complex 140 for the illustrated example is the case where the microprocessor contains an integrated dedicated data plane processing solution arranged to process the cut-through blocks. This leaves the CPU(s) 160 for the microprocessor to run the application software and manage the data plane hardware; e.g. to start and stop channels or change the routing of the cut through switch from one Rx component 120 to another Tx component 130 dynamically. Also illustrated in FIG. 1 are further CPU(s) 164, which may comprise a general purpose core or cores, which are connected either internally or externally via the bus 170. The CPU(s) 164 may be arranged to perform, say, the processing of the cut through blocks as well as the application software.

Figure 2:
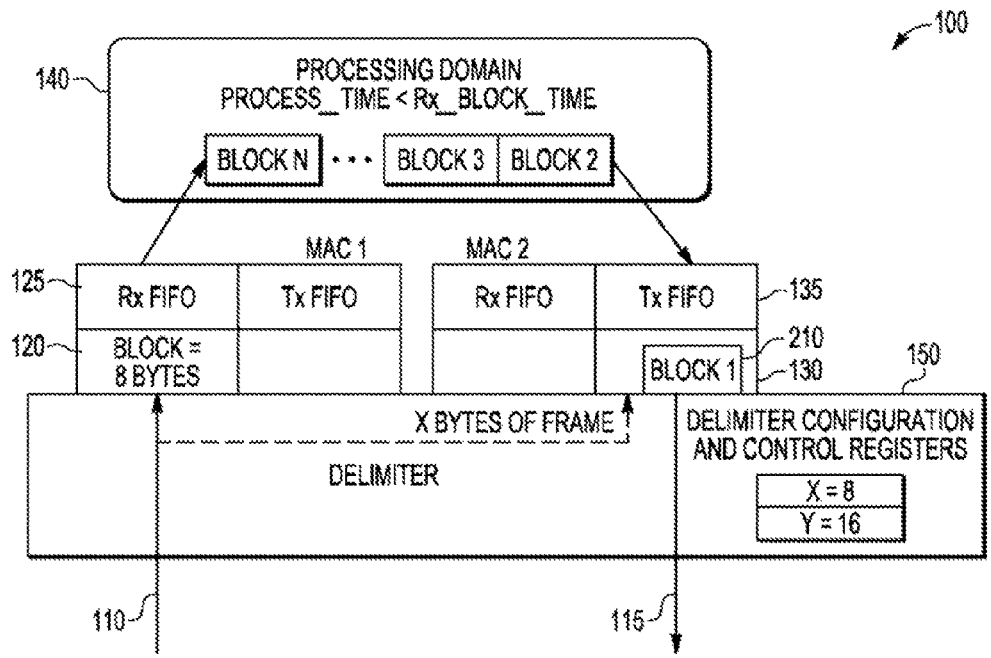
FIG. 2 shows a simplified example of performing cut-through forwarding of a data frame.

FIG. 2 illustrates a simplified example of a handling of a data frame to be forwarded by the cut-through forwarding module 100. A data frame is received by a receiver component 120 via input channel 110 in a form of a data stream. As the data is received, it is stored within the respective Rx FIFO buffer 125 by the receiver component 120. The receiver component 120 is arranged to segment the received data into blocks of, in the illustrated example, 8 bytes. Each time a block of 8 bytes has been received, the receiver component 120 signals the processing of that block of data, for example by way of generating a request. Received blocks of data are sequentially processed (by virtue of the Rx buffer 125 being a FIFO buffer) within the processing domain (i.e. within the RISC complex 140 in the example illustrated example). Upon being processed the blocks of data are transferred to the Tx FIFO buffer 135 of the respective transmitter component 130. The respective transmitter component 130 is arranged to sequentially transmit (by virtue of the Tx buffer 135 being a FIFO buffer) blocks of data that are stored within the respective Tx FIFO buffer 135 for which transmission has been triggered (e.g. for which a transmission flag or the like has been set).

In the example illustrated in FIG. 2, the delimiter component 150 is arranged to transfer 8 (X=8) bytes received at the start of each data frame (i.e. the first 8 bytes received of the data frame) from the respective Rx FIFO buffer 125 to the respective Tx FIFO buffer 135, for example upon receipt of said first 8 bytes at the start of the data frame. Thus, since X (the number of bytes automatically transferred from the Rx FIFO buffer 125 to the Tx FIFO buffer 135 by the delimiter component 150) and B (the number of bytes in a block) are configured to be equal, i.e. 8 bytes in this example, the complete first block of data is automatically transferred by the delimiter component 150 to the Tx FIFO buffer 135, as illustrated at 210. At substantially the same time for the example of FIG. 2, the receiver component 120 generates a request, or provides some other indication, for the first block 210 of data to be processed. In response to said request, the first block 210 of data is processed within the processing domain 140.

Upon generation of such a request by the receiver component 120, the processing domain 140 may, under normal conditions, be arranged to transfer the block of data to the Tx FIFO 135. However, a copy (or at least a partial copy) of the first block of data is already present in the Tx FIFO 135. Accordingly, for some examples, the delimiter 150 may comprise control flags (not shown) or switches that are arranged to turn 'on' and 'off' features of the cut-through forwarding module 100, for example to switch 'on'/'off' the feature of the processing domain 140 observing (processing) the first block of a data frame. For example, the processing domain 140 may wish to observe the first block of a data frame for classification purposes. In most cut-through modes the content of the first block of a data frame is not required to be changed. As an example, let us consider that the cut-through mode requires filtering of, say, an Ethernet destination address (first 6 bytes of the Rx packet). In this example, it could either store this for processing later when other blocks that contain more data needed for classification are received (e.g. classification on IP/UDP+Ethernet DA) or it could perform the filtering after the first block of data has been received but before the second block of data is received. The processing domain 140 could either process the first block upon receipt of a request for the first block of data when the first block of data is received, or the processing domain 140 could process the first block of data along with the second block of data upon receipt of a request for the second block of data when the second block of data is received; in this example it would be after 'Y' bytes.

An alternative example implementation may be realised by the delimiter 150 being arranged to move the first 'X' bytes for a data frame to the Tx FIFO buffer 135 and, when X=B, to the processing domain 140 also. Yet another example implementation or mode may comprise the delimiter 150 being arranged to move the first block of a data frame to the Tx FIFO buffer 135, but with the processing domain 140 not being aware of this movement. The processing domain 140 may then start with the second block of data (the first block containing unimportant data), and processing each subsequent block in sequence thereafter.

In some examples, the delimiter component 150 is further arranged to trigger a transmission of frame data within the Tx FIFO buffer 135 (i.e. the first block for the data frame 210), upon receipt of the first 16 bytes (Y=16) of the data frame by the receiver component 120. Thus, for the example illustrated in FIG. 2, since Y is configured to be equal to the size of two data blocks, the delimiter component 150 is arranged to trigger the transmission of the first block 210 upon receipt of a complete second block of data. Accordingly, processing of the second block of data starts substantially simultaneously with the triggering of the transmission of the first block of data, in response to a request generated by the receiver component 120. Once the second block of data has been processed by the processing domain 140, it is transferred to the Tx FIFO buffer 135 and the transmission thereof is triggered. Subsequently received blocks of data are handled in the same manner as the second block, with the received blocks of data being sequentially processed within the processing domain 140 in response to, for example, a request generated by the receiver component 120, and subsequently transferred to the Tx FIFO buffer 135 for transmission.

Assuming that the data rate of the input channel 110 is substantially equal to that of the data rate of the output channel 115, in order to avoid over-run of the blocks of data ready for processing within the Rx FIFO buffer 125 and under-run of the blocks of data being provided to the Tx FIFO buffer 135, and thereby potentially causing the respective data frame to be aborted, the processing time for each block of data must be less than (or at most equal to) the time taken to receive/transmit a block of data.

By triggering the transmission of the frame data after receiving Y bytes of the frame data, a substantially absolute and deterministic latency for the start of a data frame through the cut-through forwarding module 100 may be achieved; such latency may be substantially only dependent on the number Y of bytes after which transmission is triggered, and the data rate of the respective incoming channel 110. As a result, substantially the same consistent and deterministic latency may be achieved for the start of all data frames within a data stream that is being forwarded through the cut-through forwarding module 100. In this manner, substantially zero jitter may be introduced into the data stream by the cut-through forwarding module 100. In particular, zero jitter may be achieved if the delimiter component 150 and the receiver and transmitter components 120, 130 each use the same clock signal (not shown). Even if the delimiter component 150 and the receiver and transmitter components 120, 130 use different clock signals, if said clock signals comprise the same frequency, jitter may be limited to a single clock cycle.

By segmenting received data frames into blocks of B bytes to be processed and subsequently transmitted individually, processing times and latency for the blocks of data through the cut-through forwarding module 100 may be easily deduced;

where: latency=Y (the latency of a frame being defined by the delimiter's Y parameter). The maximum processing time for any block of data within a frame is dependent on block size B, processing complexity (e.g. dependent on cut-through mode) and processing capabilities (e.g. RISC operating frequencies, etc.). Furthermore, by varying the block size B and/or processing capabilities, a configuration can be found that may satisfy both the processing requirements of a particular cut-through mode and the system's latency and/or jitter requirements. Significantly, only the first block of data has relevance regarding latency and jitter, with all subsequent blocks of data having to be processed within the configured budget; which in this example is X or B bytes*line rate. In this manner, configuration of the block size B and the delimiter parameters X and Y allows the latency, jitter and programming requirements to be deterministically controlled for a specific application or protocol or specific processing domain implementation.

Figure 3:
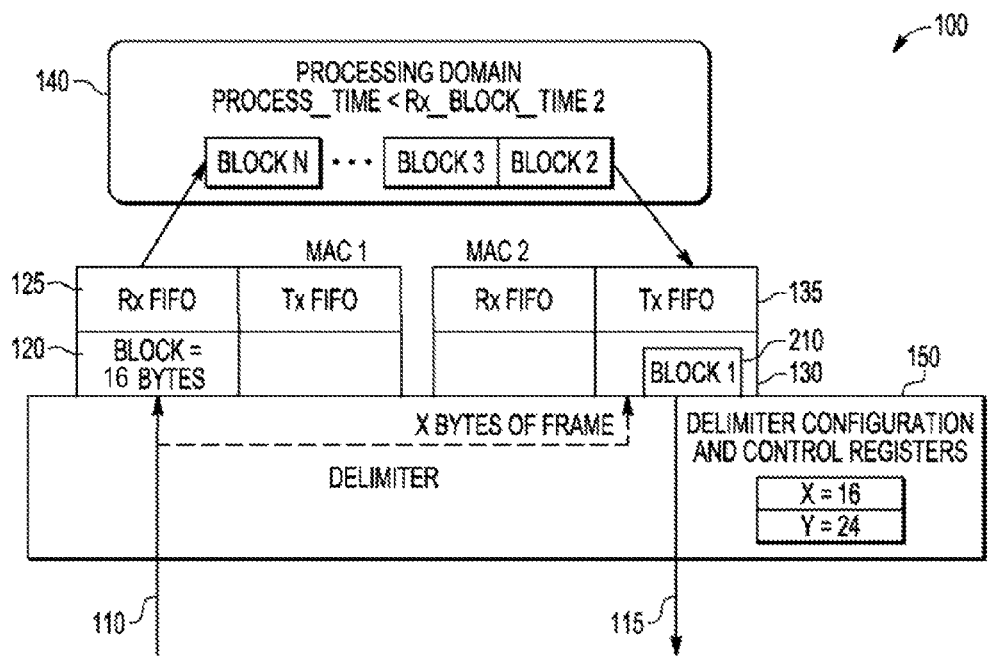
FIG. 3 shows an alternative simplified example of performing cut-through forwarding of a data frame.

FIG. 3 illustrates an alternative simplified example of a handling of a data frame to be forwarded by the cut-through forwarding module 100. In the example illustrated in FIG. 3, the receiver component 120 is arranged to segment the received data into blocks of 16 bytes. Furthermore, the delimiter 150 is arranged to transfer 16 (X=16) bytes received at the start of each data frame (i.e. the first 16 bytes received of the data frame) from the respective Rx FIFO buffer 125 to the respective Tx FIFO buffer 135, for example upon receipt of the first 16 bytes of the start of the frame. Thus, since X (the number of bytes automatically transferred from the Rx FIFO buffer 125 to the Tx FIFO buffer 135 by the delimiter component 150) and B (the number of bytes in a block) are configured to be equal, i.e. 16 bytes in this example, the complete first block of data is automatically transferred by the delimiter component 150 to the Tx FIFO buffer 135, as illustrated at 210. At substantially the same time for the example of FIG. 3, the receiver component 120, depending on the delimiter mode (configured in a mode register, not shown), may generate a request, or provide some other indication, for the first block 210 of data to be processed. In response to said request, the first block 210 may be processed within the processing domain 140.

In some examples, the delimiter component 150 is further arranged to trigger a transmission of frame data within the Tx FIFO buffer 135 (i.e. the first block for the data frame 210), upon receipt of the first 24 bytes (Y=24) of the data frame by the receiver component 120. Thus, for the example illustrated in FIG. 2, since Y is configured to be equal to the size of one and a half data blocks, the delimiter component 150 is arranged to trigger the transmission of the first block 210 substantially half way through receipt of the second block of data. Assuming the input channel 110 and the output channel 115 comprise substantially equal data rates, the transmitter component 130 will have transmitted half of the first block of data by the time the complete second block of data has been received by the receiver component 120. Accordingly, in order to avoid over-run of the blocks of data ready for processing within the Rx FIFO buffer 125 and under-run of the blocks of data being provided to the Tx FIFO buffer 135, and thereby potentially causing the respective data frame to be aborted, the maximum time between receiving the complete second block, and the second block being ready for transmission within the Tx FIFO buffer 135 having been processed, must be less than half the time taken to transmit the first block of data. The same timing restrictions apply to all subsequent blocks within the data frame.

By enabling a transmission of the data frame to be triggered in this manner by the delimiter component 150, the latency for a data frame being forwarded through the cut-through forwarding module 100 may be significantly reduced.

In the case where the frame being received comprises a header, for example an IP (Internet Protocol) header, that is larger than, say, Y bytes, it is assumed that the header of the received data frame is interpreted, but not changed. For the example illustrated in FIG. 3, the block size of 16 bytes combined with a 'transmit after 24 bytes' configuration in the delimiter 150 would not allow for changing of any fields within the header if the header is greater than, say, 24 bytes (Y), since, if any fields within the header are changed, a new header checksum will be required to be re-calculated. However, as the remainder of the header is not received until the next block of data, it is not possible to wait for the rest of the header as this would cause under-run in doing so.

For the illustrated examples, X is required to be less than, or at most equal to Y (X can only be equal to Y if B is less than X otherwise X must be less than Y) in order to ensure that data is available within the Tx FIFO buffer 135 when the delimiter component 150 triggers the transmission of the first block of data. Furthermore, for the illustrated examples, Y is required to be greater than (or at least equal to) the block size B in order to ensure that a transmission of the first block of data is not completed before the entire second block has been received.

For some example embodiments of the present invention, the block size B may be configured to be equal to, say, $B=X=Y/2$;

where: Y is configured to achieve a desired latency through the cut-through forwarding module 100, and X and B are configured to a value that accommodates the processing requirements of the cut-through mode deployed on a processing complex with a certain level of performance (e.g. RISC frequency). This example may, in particular, be implemented where the first block, or X bytes, of data transmission is triggered when the second block of data of the frame has been fully received and/or when the Rx FIFO buffer 125 signals to the processing domain 140 that the second block of data is ready for processing.

Figure 4:
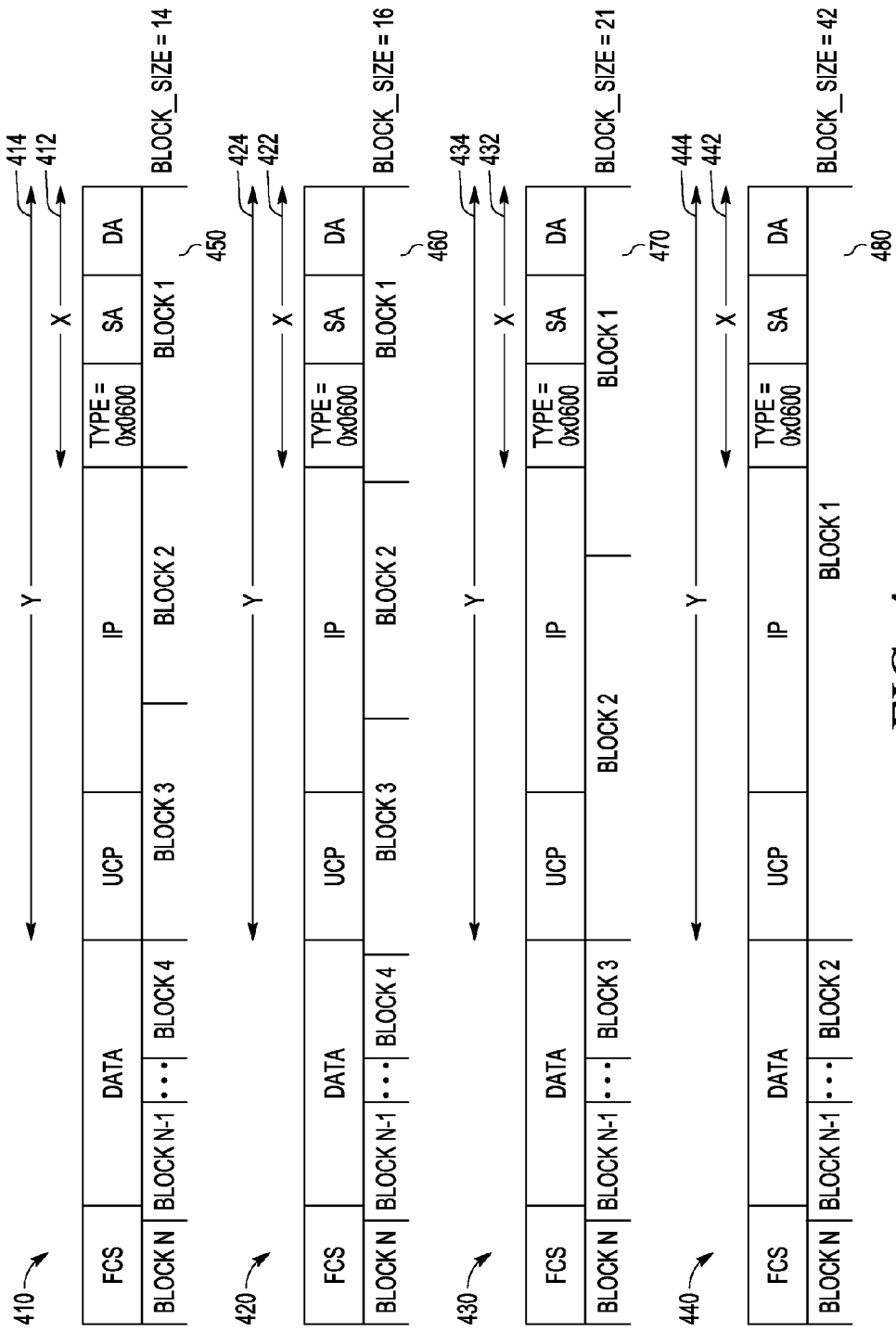
FIG. 4 shows examples of cut-through forwarding parameter configurations.

However, any suitable configuration of the values B, X and Y may be implemented. For example, FIG. 4 illustrates some further examples of possible parameter configurations, and their respective relationships with received data frames. For each example illustrated in FIG. 4, X 412, X 422, X 432, and X 442 are configured to comprise a value of 14 bytes, 16 bytes, 21 bytes, and 42 bytes, respectively, and Y 414, Y 424, Y 434, and Y 444 are configured to comprise a value of 42 bytes. A first example, indicated generally at 410, comprises a block size B 450 of 14 bytes; a second example, indicated generally at 420, comprises a block size B 460 of 16 bytes; a third example, indicated generally at 430, comprises a block size B 470 of 21 bytes; and a fourth example, indicated generally at 440, comprises a block size B 480 of 42 bytes. In each of these examples, by setting the parameters Y 414, Y 424, Y 434, and Y 444 to 42 bytes, a latency of 42 bytes is defined for triggering transmission through the cut-through forwarding module 100. The varying block sizes B 450, B 460, B 470, and B 480 define the more general latency of data through the receiver component 120 and the cut through mode processing requirements in the processing domain 140 of the cut-through forwarding module 100. As such the relationship between the block size B 450, B 460, B 470, and B 480 and the number of bytes Y 414, Y 424, Y 434, Y 444, after which transmission of frame data is triggered, has an impact on the amount of data that is required to be stored within the Tx FIFO buffer 135 awaiting transmission, and thus the memory requirements (e.g. size of the Tx FIFO buffer 135) for the cut-through forwarding module 100. Notably, less FIFO memory is needed when compared to, say, a store forward architecture that is required to buffer one or more full frames.

Thus, the parameter Y effectively defines a latency of packet forwarding within the cut-through module 100, which is equal to the transmit time of the first bit of frame over the output channel 115 minus the receive time of first bit of frame on the input channel 110; it also defines the number of bits/bytes that the delimiter 150 waits before triggering transmission from the Tx FIFO 130 to the physical interface 115. The parameter X defines the number of bits/bytes that the delimiter moves to the Tx FIFO 130, it also defines directly or influences the amount of time for the processing domain 140 in order to handle the second block of the frame before encountering under-run or overrun. The parameter B defines the number of bits/bytes in a data block, and thereby defines the frequency of requests to the processing domain 140; in some cases this is also the processing budget for the processing domain to handle any single block within the frame.

For some examples, the interaction between the parameters X, Y, and B, and their relationship with the available processing time within the processing domain 140 for each data block, may be illustrated as follows. In a first example let:

B=Block size; and Y=2×B.

If X is configured to be less than the block size B, the available processing time for a first block of frame data will be equal to the receive time for B bytes of data over the input channel 115. For a second block of frame data, if the remainder of the first block of data (B−X bytes) is transferred to the Tx FIFO buffer 135 by the processing domain 140, then the available processing time will also be equal to the receive time for B bytes. However, if the remainder of the first block of data (B−X bytes) is not transferred to the Tx FIFO buffer 135 by the delimiter component 150, the available processing time for a second block of frame data (plus the B−X bytes outstanding for the first frame) will be equal to the receive time for X bytes (i.e. the second block of frame data may have less processing time available due to the configuration of X in relation to B). For the third and each subsequent block of frame data, the available processing time will be equal to the receiving time for B bytes of data.

Conversely, if X is configured to be greater than or equal to the block size B, where the delimiter component 150 is arranged to transfer the full first block of data plus the number bytes in addition to B to equal X (X−B), then substantially no processing time will be available for the first block of data. Otherwise, the available processing time for the first block of frame data will be equal to the receiving time for B bytes of data. For the second and each subsequent block of frame data, the available processing time will be equal to the receiving time for B bytes of data.

In a second example let:

B=Block size; and Y<2×B.

In this example, if X is configured to be less than the block size B, the available processing time for a first block of frame data will be equal to the receive time for B bytes of data. For a second block of frame data, the available processing time will equal to Y+X−2B. Here we start sending the X bytes after Y bytes as normal. If the request for the first block does not place the remaining B−X bytes into the FIFO there is less time before under-run on Tx. Some of the X bytes are sent before the second block is fully received which further decreases the processing time before under-run for the second block. For example, if we say that B=8, X=7 and Y=14, then we have 7 bytes in the Tx FIFO when the Tx is triggered (after Y bytes), now as Y is 14 we start sending the X bytes 2 bytes before the second block requests to the processing domain, so when the processing domain starts only 5 bytes remain in the Tx FIFO which means 5 bytes to under-run; thus Y+X−2B=14+7−16=5. Now for this case the second block processing routine has to place into the Tx FIFO the remainder of the first block and all of the second block; in this case 9 bytes (2B−X). As the second block request occurs when there are only 5 bytes left in the Tx FIFO, and as the processing domain places 9 bytes into the Tx FIFO, when a request for the third block occurs there are 9+5−B bytes in the Tx FIFO, i.e. 6 bytes (Y−B). Thus, for the third and each subsequent block of frame data, the available processing time will be equal to Y−B.

Conversely, if X is configured to be equal to the block size B, where the delimiter component 150 is arranged to transfer the full first block of data to the Tx FIFO buffer 135, then substantially no processing time will be available for the first block of data. Otherwise, the available processing time for the first block of frame data will be equal to the receiving time for B bytes of data. For the second and each subsequent block of frame data, the available processing time will be equal to Y−B.

Conversely, if X is configured to be greater than the block size B, where the delimiter component 150 is arranged to transfer the full first block of data to the Tx FIFO buffer 135, then substantially no processing time will be available for the first block of data. Otherwise, the available processing time for the first block of frame data will be equal to the receiving time for B bytes of data. For the second block of frame data, the available processing time will be equal to the receiving time for B bytes of data. For the third and each subsequent block of frame data, the available processing time will be equal to Y−B.

In a third example let:
B=Block size; and Y=B.

When the complete first block has been received, transmission of the first X bytes that have been transferred to the Tx FIFO buffer 135 by the delimiter component 150 begins. The processing domain 140 then has the time required to transmit X bytes to get the remaining bytes (Y-X) into the Tx FIFO buffer 135 as well as process the data of the first block. Upon receipt of the complete second block of frame data, there will be an under-run as there is no overlap for processing. In order to overcome this, the delimiter component 150 may be configured to only process the first block of data. In this manner, the delimiter component 150 may forward all subsequent blocks to the Tx FIFO buffer, avoiding the need for such transferring to be performed by the processing domain 140, which may need only a small delay of, say, a few bits, to avoid under-run. In such an example, the delimiter component is used to open and close a processing window for the critical data needed in the application of the cut-through forwarding. This also enables a reduction in the performance needed for the processing domain since only a single block needs to be processed.

In some examples, the values B, X and Y may be configurable parameters. In this manner the cut-through forwarding module 100 may be configured to meet different latency and jitter requirements, and thus may be capable of supporting more than one cut-through forwarding mode. For example, by modifying the block size B, the time taken to receive a complete block, and the time required to process that block, may be modified. Thus, the processing budget for blocks of data through the receiver component 120 and processing domain 140 of the cut-through forwarding module 100 may be controlled in order to satisfy the requirements of the cut through mode, latency and jitter of the system and the processing speed of the processing domain 140. Conversely, by modifying the number of bytes Y, after receipt of which the transmission of frame data is triggered by the delimiter component 150, the latency for data frames through the cut-through forwarding module 100 may be dynamically controlled.

In particular, in some examples, the parameters X and Y may be software configurable (e.g. configurable by software running on one or more of the CPUs 160, 164), and thus capable of being configured 'on-the-fly', for example to take into consideration changes in network topology or the like. For example, FIG. 5 illustrates an example of such 'on-the-fly' configuration of, in particular, the parameter Y, which directly affect the latency of data frames through the cut-through forwarding module 100.

Figure 5:
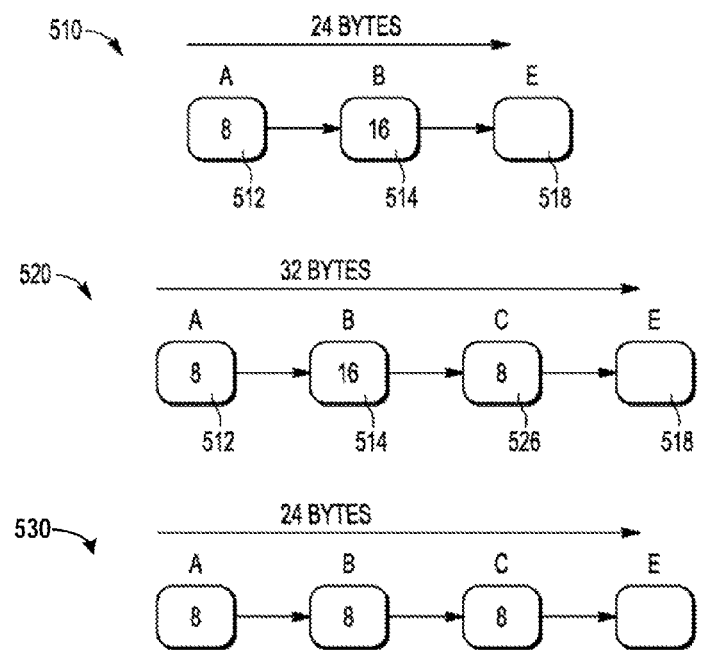
FIGS. 5 and 6 show simplified examples of cut-through forwarding parameter configuration modifications within packet switching networks.

Specifically, FIG. 5 illustrates a simplified block diagram of an example of a packet switching network comprising a first topology 510. In this first topology 510, the packet switching network comprises a data path comprising a first and second network element 512, 514 arranged to receive and forward packets of data. Such network elements may be implemented by way of cut-through forwarding modules, such as the cut-through forwarding module 100 of FIG. 1. The packet switching network for the illustrated example further comprises a destination element 518 to which data packets are forwarded. For this simplified illustrated example, data packets are forwarded from the first network element 512 comprising a latency of 8 bytes, through the second network element 514 comprising a latency of 16 bytes, to the destination element 518. Thus, for this first topology 510, the data path of the packet switching network comprises a total latency of 24 bytes (8+16).

FIG. 5 further illustrates a simplified block diagram of the packet switching network following a change in the network topology resulting from the introduction of a new network element 'C'. This second network topology is illustrated at 520, with the new network element being indicated at 526. As a result of the introduction of this new network element 526, data packets are now forwarded from the first network element 512 comprising a latency of 8 bytes, through the second network element 514 comprising a latency of 16, through the new network element 526 comprising a further latency of 8 bytes, to the destination element 518. Thus, for this second topology 520, data path of the packet switching network comprises a total latency of 32 bytes (8+16+8). For real time applications, such a change in the total latency across a data path may impact on the operation of a system in which the data path functions. Conventionally, in order to accommodate such a change in the network topology without making changes to applications, etc., within the rest of the system, it would be necessary to modify the latency within the various network elements 512, 514, 526 of the data path by, typically, modifying the block sizes B used by the individual cut-through forwarding modules used to implement the network elements 512, 514, 526. However, changing the block size B used by a cut-through forwarding module requires modifications to be made within the processing domain therein in order to correctly process the newly sized blocks of data. Such changes typically require the cut-through forwarding module to be taken 'off-line' and reconfigured; thus causing disruption to the network whilst such changes are made.

However, in some examples of the present invention, the parameters X and Y for the cut-through forwarding module 100 may be software configurable (e.g. configurable by software running on one or more of the CPUs 160, 162, 164), and thus capable of being configured 'on-the-fly'. Thus, for the example illustrated in FIG. 5, by re-configuring, say, the value Y for one of more of the network elements 512, 514, 526 of the data path, the latency through the reconfigured network element(s) may be modified to compensate for any changes in the network topology. By way of example, and as illustrated at 530, the second network element 514 may be implemented by way of a cut-through forwarding module such as the cut-through forwarding module 100 of FIG. 1, and may be arranged to trigger the transmission of frame data upon receipt of Y bytes of the respective data frame. Thus, in the first topology 510 the parameter Y of the network element 514 may be configured to a value of 16 bytes in order to provide the 16 byte latency through the network element 514. Following the introduction of the new network element 526, by re-configuring the parameter Y of the network element 514 to a value of 8 bytes, the latency through the network element is reduced to 8 bytes, thereby maintaining a total latency for the data path of 24 bytes, as illustrated at 530. Advantageously, since such re-configuration of the parameter Y requires no changes to the block size B (e.g. B=4) for the cut-through forwarding module 100, no modifications are required to be made within the processing domain 140 thereof. Accordingly, such a modification to the parameter Y, and thus to the latency of the cut-through forwarding module 100, is able to be made 'on-the-fly', without the need for the cut-through forwarding module 100 to be taken off-line.

Figure 6:
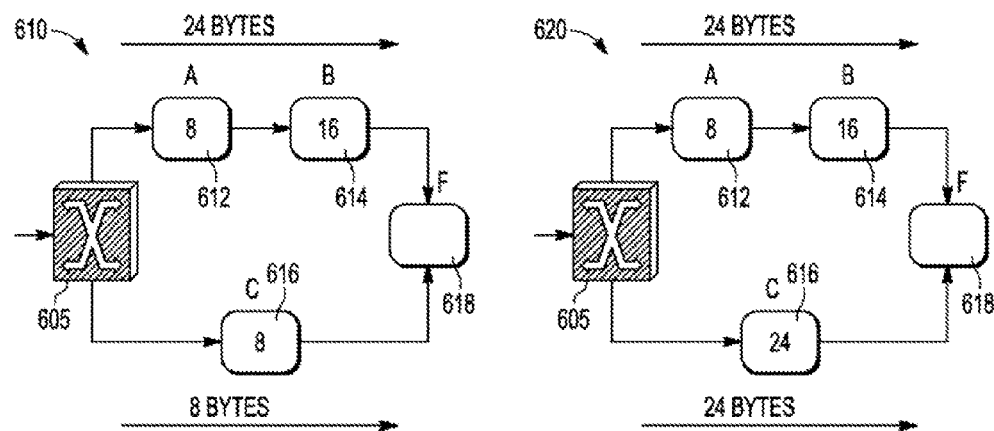

FIG. 6 illustrates an alternative example of such 'on-the-fly' configuration. Specifically, FIG. 6 illustrates a simplified block diagram of an example of a packet switching network in a first configuration 610. The packet switching network comprises a first data path, originating from a network branch 605, comprising network elements 612 and 614, and terminating at a destination element 618. The packet switching network comprises a second data path, also originating from the network branch 605, comprising network element 616 and also terminating at the destination element 618. In this first configuration 610 of the packet switching network, the first and second network elements 612, 614 of the first data path comprise latencies there through of 8 bytes and 16 bytes respectively. As such, the first data path comprises a total latency of 24 bytes. Conversely, the network element 616 within the second data path comprises a latency of 8 bytes. As such, the second data path comprises a total latency of 8 bytes.

The existence of two data paths between the network branch 605 and the destination element 618 comprising different latencies may result in data packets being routed via the different data paths, and arriving out of order at the destination element 618. As a result, the destination element 618 is required to comprise more sophisticated software in order to be able to identify data packets that are received out of order, and thereafter re-order the received data packets. However, by modifying the latencies of one or more of the network elements 612, 614, 616 such that the two data paths comprise the same total latency, data packets will arrive at the destination element 618 in the correct order, irrespective of which of the two data paths the individual data packets are routed via.

Accordingly, and as illustrated at 620, by implementing, say, the network element 616 of the second data path by way of a cut-through forwarding module arranged to trigger the transmission of frame data upon receipt of Y bytes of the respective data frame, such as the cut-through forwarding module 100 of FIG. 1, and by configuring Y to equal, in the illustrated example, 24 bytes (i.e. the total latency of the first data path), the latency of the network element 616, and thus of the second data path, may be configured to be equal to that of the first data path. Furthermore, and as explained above, such a configuration change requires no modification to the block size B used within the network element 616, and thus no modification to the processing domain therefor.

For some example alternative embodiments, the network branch 605 may be arranged to implement redundancy between the first and second data paths. For example, either of the first data path comprising network elements 612 and 614 or the second data path comprising the network element 616 may be arranged to actively forward frames, while the other data path is in a state of inertia. If the data path actively forwarding the frames fails or becomes corrupted in any way, the network branch 605 may switch to forwarding the frames on the other, non-failing data path. By configuring the latency of the two data paths to be substantially equal, as described above, the receiving network element 618 will observe substantially equal frame receive times irrespective of the data path via which a frame is forwarded, and thus no modification to the processing domain 140 therefor is necessary following switching of the data path via which frames are forwarded.

Alternatively, and in accordance with further examples, the network branch 605 may be arranged to duplicate packets of data and forward them via both of the data paths substantially simultaneously. By configuring the latency of the two data paths to be substantially equal, as described above, the receiving network element 618 will receive the duplicated packets via each data path at substantially the same time. As such, the receiving network element 618 may choose to discard one packet or keep both copies of the packet. If one data path fails, as the latency of each data path has been substantially matched, the receiving network element 618 will observe substantially equal frame receive times irrespective of the data path via which a frame is forwarded, and thus no modification to the processing domain 140 therefor.

In some examples, the network elements 612, 614, 616 and 618 may share the same clock (not shown). In this manner, an additional synchronicity for the transmission of data packets via the different data paths may be achieved.

Thus, an example of a cut-through forwarding module 100 has been described that is capable of providing deterministic forwarding latency with low, and potentially zero, jitter in a cut-through forwarding scheme, whilst allowing a data frame to be handled in software on the fly. In particular, an example of the present invention has been described in which a delimiter component 150 is arranged to automatically transfer X bytes of a data frame being received to the respective Tx FIFO buffer 135, and trigger the transmission of the frame data therefrom after the receipt of Y bytes of the data frame; X, and Y being configurable parameters. This enables the latency and jitter to be deterministically controlled, whilst allowing the scheme to support multiple protocols in multiple applications via software. In addition, by segmenting a received data frame into configurable blocks of B bytes within the Rx FIFO buffer 125 in real time, the latency and the processing requirements are able to be easily deduced for specific applications, protocols, processing capabilities, etc.

In particular, for some example embodiments of the present invention, the receiver and transceiver components 120, 130 and the delimiter component 150 may be implemented, at least partly, in hardware to take advantage of the improved performance achievable thereby, and thus to facilitate achieving the latency and/or jitter requirements for multiple cut-through forwarding modes. Conversely it is contemplated that, for some example embodiments of the present invention, the processing domain 140 may be implemented, at least partly, in software to take advantage of the flexibility achievable thereby, and thus enable multiple cut-through forwarding modes to be supported.

Although examples have been described in terms of transferring 'bytes' of data, other examples may be applied to the transfer of any form or number of data elements, including bits, bytes, frames, etc.

In addition to enabling deterministic forwarding latency with potentially zero jitter within a cut-through forwarding scheme, example embodiments of the present invention may further enable reduced MIPS (millions of instructions per second) requirements for the application, which may be achieved due to the cut-through module 100 being substantially generic and capable of supporting a wide range of protocols. Furthermore, since jitter and latency are capable of being controlled by the delimiter 150, no dedicated high priority software module is needed to guarantee latency and jitter targets, which can simplify application software significantly. It can also reduce the size of the software and simplifies the complexity, as multiple modes are supported by a single integrated circuit device hardware block implementation, as opposed to requiring multiple hardware blocks on the same integrated circuit device or on a plurality integrated circuit devices.

In addition, for some examples, a reduced amount of memory for buffering may be achieved, since the size of the Rx/Tx FIFO buffers may be reduced as only a relatively small portion of the frame is stored at any point during the forwarding operation. In particular, compared to store forward this also saves a lot on memory e.g. DDR, FIFO or DPRAM based buffering allocated to storing packets for processing, which is not required for some examples of the present invention.

In addition, for some examples, a reduced amount of hardware (RTL—resistor transistor logic) may be required to realize support of multiple protocols, since in some examples only the delimiter and FIFO segmenting system needs to be designed in hardware. Furthermore, for some examples, there is no necessity for a unique hardware block per cut-through mode as each mode is implemented in software.

In addition, for some examples, reduced die size, test vectors, test time and therefore manufacturing costs of an integrated circuit device supporting a plurality of cut-through forwarding modes/protocols may be achieved due to less hardware to test, smaller chip size, less power easier to package, etc.

Examples of cut-through forwarding modes that may be supported by a cut-through forwarding module implemented in accordance with some example embodiments of the present invention include, by way of example only, Ethernet protocols such as EtherCAT (Ethernet for Control Automation Technology), ProfiNET, Ethernet/IP, DLR (Device Level Ring) or a cut-through switch for IP traffic.

Figure 7:
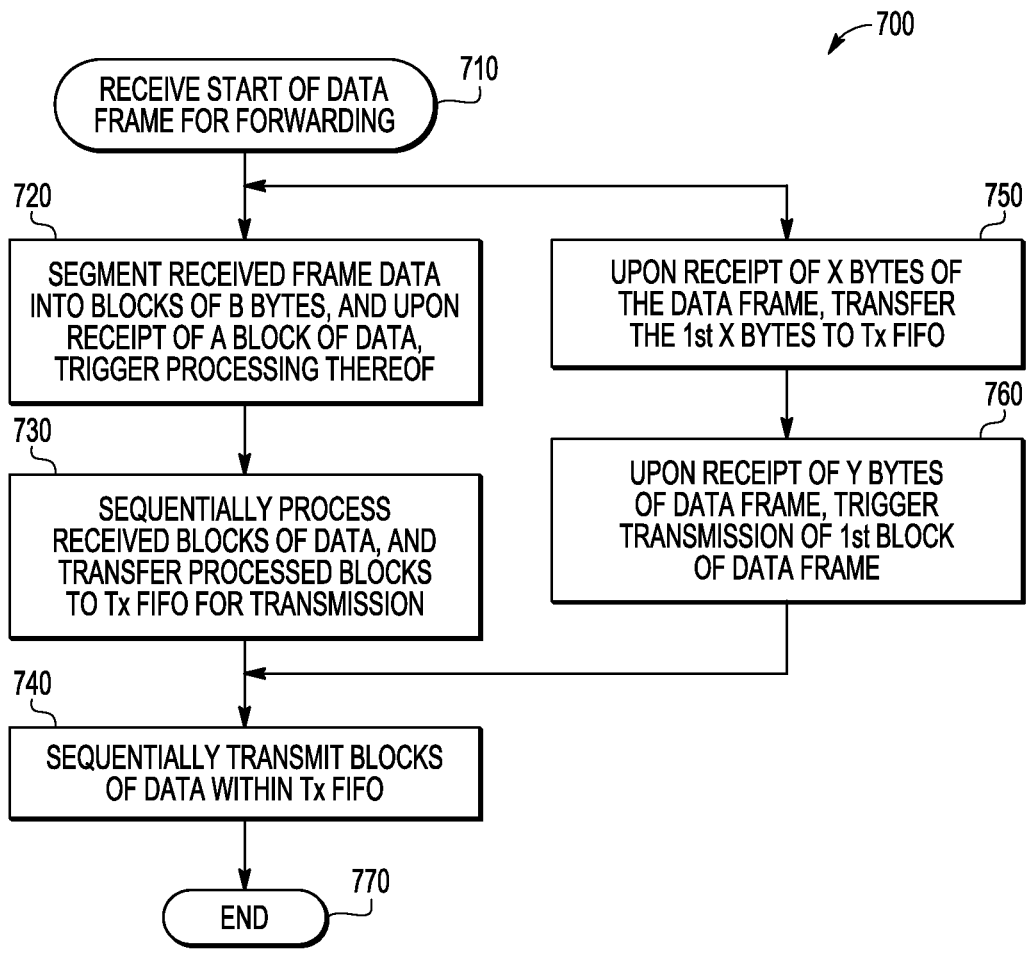
FIG. 7 shows a simplified flowchart of a method of performing cut-through forwarding of packet data.

Referring now to FIG. 7, there is illustrated a simplified flowchart 700 of an example of a 10 method of performing cut-through forwarding of packet data, for example as may be implemented within the cut-through forwarding module 100 of FIG. 1. The method starts at 710 with a receipt of the start of a data frame to be forwarded, for example by the receiver component 120. The received frame data is segmented into blocks of B bytes, for example within the Rx FIFO buffer 125, and, upon receipt of each block of data, processing of that block is triggered, at 720. For example, the processing of a block of data may be triggered by generating a request that is provided to the processing domain 140. Blocks of data are then sequentially processed, for example within the processing domain 140, and the processed blocks transferred to a transmitter buffer, such as the Tx FIFO buffer 135 of FIG. 1, for transmission, at 730.

For the illustrated example, following receipt of the start of a data frame to be forwarded at 710, the method of FIG. 7 further comprises, upon receipt of X bytes of the frame data, transferring those X bytes of frame data from, for example, the Rx FIFO buffer 125 to the Tx FIFO buffer 135 of FIG. 1, at 750. Subsequently, upon receipt of Y bytes of frame data, the method further comprises triggering the transmission of a first block of the frame data from the Tx FIFO buffer 135, at 760. Blocks of data within the Tx FIFO buffer 135 are then sequentially transmitted, at 740. The method ends at 770, for example with a transmission of the last block of data for a received data frame.

The invention may also be implemented, at least partially, in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented that achieve the same functionality. For example, for ease of understanding the delimiter component 150 has been illustrated generally in FIG. 1 as comprising a single, discrete functional block within the integrated circuit device 105. However, it will be appreciated that the functionality of the delimiter component 150 may alternatively be distributed across multiple functional blocks, and/or may be implemented within one or more of the other components within the cut-through forwarding module 100. For example, the functionality of the delimiter component 150 may be implemented, at least in part, within the functional units of, say the receiver component 120 and/or the transmitter component 130 of the cut-through forwarding module 100.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, for the example illustrated in FIG. 1, the cut-through forwarding module 100 is implemented within a single integrated circuit device 105. Alternatively, the examples may be implemented as any number of separate integrated circuits or separate devices interconnected with each other in a suitable manner. For example, the various components of the cut-through forwarding module 100, such as the receiver component 120, transmitter component 130, the various components making of the processing domain 140, etc., may be distributed across a plurality of integrated circuit devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
a cut-through forwarding module comprising:
at least one receiver component arranged to receive data to be forwarded;
at least one transmitter component arranged to transmit data stored within at least one transmitter buffer thereof; and
at least one delimiter component arranged to trigger a transmission of frame data within the at least one transmitter buffer, upon receipt of a first number and a second number of data elements of a respective data frame by the at least one receiver component, the first number of data elements comprising a first predefined integer value and the second number of data elements comprising a second predefined integer value.

2. The integrated circuit device of claim 1 wherein the at least one receiver component comprises at least one receiver buffer within which received data is stored.

3. The integrated circuit device of claim 2 wherein the at least one delimiter component is arranged to transfer the second number of data elements at a start of a data frame upon receipt of said second number of data elements by the cut-through forwarding module from the at least one receiver buffer to the at least one transmitter buffer.

4. The integrated circuit device of claim 2 wherein the at least one receiver component is arranged to segment received data into blocks of a third number of data elements of data to be individually processed and subsequently transmitted.

5. The integrated circuit device of claim 1 wherein the second number of data elements is less than or equal to the first number of data elements.

6. The integrated circuit device of claim 5 wherein the at least one delimiter component is arranged to transfer the second number of data elements at a start of a data frame upon receipt of said second number of data elements by the cut-through forwarding module from the at least one receiver buffer to the at least one transmitter buffer.

7. The integrated circuit device of claim 5 wherein the at least one receiver component is arranged to segment received data into blocks of a third number of data elements of data to be individually processed and subsequently transmitted.

8. The integrated circuit device of claim 1 wherein the at least one receiver component is arranged to segment received data into blocks of a third number of data elements of data to be individually processed and subsequently transmitted.

9. The integrated circuit device of claim 8 wherein the delimiter comprises at least one from a group consisting of:
   an intra-connected bus; and
   a shift register;
   a counter; and
   at least one register.

10. The integrated circuit device of claim 1 wherein at least one from a group consisting of: the integer value of the first number of data elements, the integer value of the second number of data elements, a third number of data elements, is/are a software configurable parameter.

11. The integrated circuit device of claim 1 wherein the delimiter comprises at least one from a group consisting of:
    an intra-connected bus; and
    a shift register;
    a counter; and
    at least one register.

12. A method of performing cut-through forwarding of packet data, the method comprising, within a cut-through forwarding module:
    receiving frame data to be forwarded; and
    triggering the transmission of frame data upon receipt of a first number and a second number of data elements of a respective data frame, the first number of data elements comprising a first predefined integer value and the second number of data elements comprising a second predefined integer value.

13. The method of claim 12 wherein the second number of data elements is less than or equal to the first number of data elements.

14. The method of claim 13 wherein transferring the second number of data elements comprises transferring the second number of data elements at a start of a data frame being received to a transmitter buffer, upon receipt of said second number of data elements.

15. The method of claim 13 further comprising segmenting received frame data into blocks of a third number of data elements of data to be individually processed and subsequently transmitted.

16. The method of claim 12 wherein transferring the second number of data elements comprises transferring the second number of data elements at a start of a data frame being received to a transmitter buffer, upon receipt of said second number of data elements.

17. The method of claim 16 further comprising segmenting received frame data into blocks of a third number of data elements of data to be individually processed and subsequently transmitted.

18. The method of claim 12 further comprising segmenting received frame data into blocks of a third number of data elements of data to be individually processed and subsequently transmitted.

19. The method of claim 18 further comprising segmenting received frame data into blocks of a third number of data elements of data to be individually processed and subsequently transmitted.

20. The method of claim 12 further comprising configuring via software at least one from a group consisting of: the integer value of the first number of data elements, the integer value of the second number of data elements, a third number of data elements.

* * * * *